United States Patent
Louban

(10) Patent No.: US 8,983,232 B2
(45) Date of Patent: Mar. 17, 2015

(54) METHOD FOR EVALUATING THE CENTERLINE OF AN ARBITRARILY SHAPED OBJECT

(75) Inventor: Roman Louban, Crailsheim (DE)

(73) Assignee: DCG Systems, Inc., Fremont, CA (US)

( * ) Notice: Subject to any disclaimer, the term of this patent is extended or adjusted under 35 U.S.C. 154(b) by 294 days.

(21) Appl. No.: 13/439,778

(22) Filed: Apr. 4, 2012

(65) Prior Publication Data

US 2013/0259376 A1    Oct. 3, 2013

Related U.S. Application Data

(60) Provisional application No. 61/617,622, filed on Mar. 29, 2012.

(51) Int. Cl.
  *G06K 9/36*    (2006.01)
  *G06T 7/60*    (2006.01)

(52) U.S. Cl.
  CPC ....... *G06T 7/606* (2013.01); *G06T 2207/10004* (2013.01); *G06T 2207/20021* (2013.01); *G06T 2207/30152* (2013.01); *G06T 2207/30172* (2013.01)
  USPC .......................................... 382/286; 382/288

(58) Field of Classification Search
  CPC ..................... G06T 7/606; G06T 2207/30172; G06T 2207/30152
  See application file for complete search history.

(56) References Cited

U.S. PATENT DOCUMENTS

| | | | |
|---|---|---|---|
| 5,825,914 A | 10/1998 | Tsuboi et al. | |
| 7,474,776 B2 * | 1/2009 | Kaufman et al. | 382/128 |
| 2003/0152897 A1 | 8/2003 | Geiger | |
| 2010/0163732 A1 * | 7/2010 | Louban et al. | 250/341.6 |
| 2011/0123093 A1 * | 5/2011 | Alloo et al. | 382/149 |
| 2011/0194776 A1 | 8/2011 | Nakamura et al. | |

FOREIGN PATENT DOCUMENTS

| | | |
|---|---|---|
| DE | 112004000128 B4 | 10/2007 |
| DE | 102007031206 B3 | 2/2009 |
| DE | 102010047278 A1 | 4/2012 |
| WO | 2013/147919 A1 | 10/2013 |

OTHER PUBLICATIONS

Faramarzi et al., "Image processing for radiographic films of weld inspection", May 2011.*

(Continued)

*Primary Examiner* — Anand Bhatnagar
*Assistant Examiner* — Soo Park
(74) *Attorney, Agent, or Firm* — Nixon Peabody LLP; Joseph Bach, Esq.

(57) ABSTRACT

A method for calculating a centreline of an object is disclosed. An image of the object is divided into test areas. For each test area, detection direction and scanning direction are assigned from a list of limited directions. For each test area, at each scanning point a local point of the centreline is determined along the detection direction. An assigned smoothing function is applied to the collection of local points to determine the collection of pixels which define the centreline. The collection of pixels can be used to calculate the length of the centreline. Also, the coordinates of the pixels of the centreline can be used to average the intensity of the image along the centreline.

12 Claims, 3 Drawing Sheets

(56) References Cited

OTHER PUBLICATIONS

International Search Report for PCT/US2012/032224 dated Feb. 27, 2013.
Invitation to Pay Additional Fees and, Where Applicable Protest Fee for PCT/US2012/032224 dated Dec. 5, 2012.
Faramarzi, F., et al., "Image processing for radiographic films of weld inspection," May 2011.
Huang, W., et al., "A Laser-Based Vision System for Weld Quality Inspection," Sensors, 2011, 11(1), pp. 506-521.
Kirbas, C., et al., "A Review of Vessel Extraction Techniques and Algorithms," ACM Computing Surveys, vol. 36, No. 2, Jun. 2004, pp. 81-121.
Maddah, M., et al., "Fast Center-Line Extraction for Quantification of Vessels in Confocal Microscopy Images," Inst. for Studies in Theor. Phys. & Math, Biomedical Imaging, 2002. Proceedings on 2002 IEEE International Symposium, pp. 461-464.
Mena, J. B., "State of the art on automatic road extraction for GISis update: a novel classification," Pattern Recognition Letters, Elsevier, vol. 24, No. 16, Dec. 2003, pp. 3037-3058.
Nacereddine, N., et al., "Weld defect detection in industrial radiography based digital image processing," World Academy of Science, Engineering and Technology 2, 2005, pp. 115-118.
Ricardo Da Silva, R., et al., "State-of-the-Art of Weld Seam Inspection by Radiographic Testing: Part I—Image Processing," NDT.net—www.ndt.net—Document Information: www.ndt.net/search/docs.php3?id=4832, 2007.
Sun, Y., "Automated Identification of Vessel Contours in Coronary Arteriograms by an Adaptive Tracking Algorithm", IEEE Transactions on Medical Imaging, vol. 8, No. 1, Mar. 1989.
Tao, C., et al., "Automatic Reconstruction of Road Centerlines from Mobile Mapping Image Sequences," Photogrammetric Engineering & Remote Sensing, Jul. 1998, vol. 64, No. 7, pp. 709-716.
Zhang, Q., et al., "Accurate Centerline Detection and Line Width Estimation of Thick Lines Using the Radon Transform," IEEE Transactions on Image Processing, vol. 16, No. 2, Feb. 2007, pp. 310-316.
Zitkevicius, E., et al., "On Skeletonization of Blood Vessels in Angiographic MRI Images of Human Brain," ISSN 1392-124X Information Technology and Control, 2007, vol. 36, No. 4, pp. 372-376.
Nagao, T., et al., "An Automatic Road Vector Extraction Method from Maps," IEEE 9th International Conference on Pattern Recognition, Nov. 1988, pp. 585-587, vol. 1.
Toth, C.K., et al., "Near Real-Time Road Centerline Extraction," Center for Mapping, The Ohio State University, 43212-1154, Columbus, OH, USA; Department of Civil and Environmental Engineering and Geodetic Science 2, The Ohio State University; Commission III.

\* cited by examiner

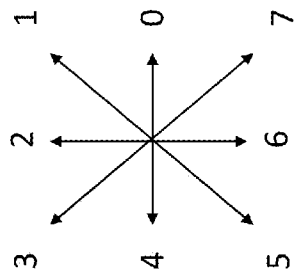
*Figure 1 – Prior Art*
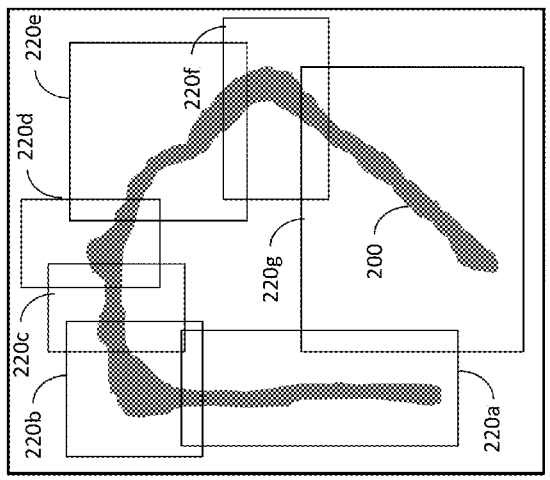
*Figure 2*
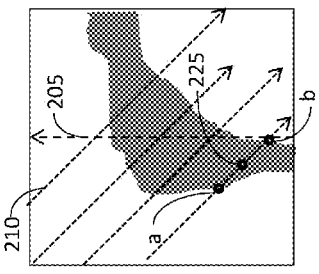
*Figure 3*
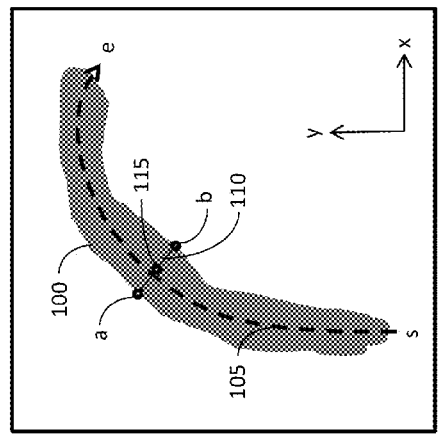
*Figure 4A*
*Figure 4B*
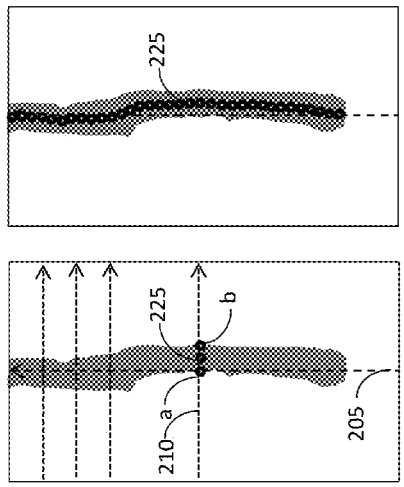
*Figure 5A*
*Figure 5B*

METHOD FOR EVALUATING THE CENTERLINE OF AN ARBITRARILY SHAPED OBJECT

RELATED APPLICATION

This Application claims priority benefit from U.S. Provisional Application No. 61/617,622, filed on Mar. 29, 2012, the disclosure of which is incorporated herein by reference in its entirety.

BACKGROUND

1. Field

The invention refers to a method for automatically evaluating the center line of an arbitrarily shaped object using, e.g., a digitized image of the object.

2. Related Art

Various methods have been used for automatic evaluation of objects and shapes, especially in automatic examination of objects during manufacturing. In such methods, an image of the object to be examined is taken by means of, e.g., high-dynamic range camera, an infrared camera, an x-ray camera, an ultra-sonic device, etc. The image is transferred to a calculating unit and is processed by means of image processing methods. Some automatic testing and evaluation procedures require the system to determine the centerline of the imaged object. The centerline is composed of interior points of the object, which extend along the lengthwise run of the object, and which are each positioned at the mid-distance to the boundaries of the object around the point, whether the investigation is done in two or three dimensions. The length of the centerline can represent the length of the object to be examined. Therefore, the evaluation of the centerline can be taken as an aid for solving various digital geometrical or topological problems, for example, in the course of measuring an object. Furthermore, the points of the centerline may contain information on the inner area of the object to be examined. Therefore, an automatic method for evaluating the centerline of an object is of substantial economic importance. Examples where the centerline evaluation may be useful include automatic evaluation of roads using, e.g., satellite images or stereo images from mobile mapping systems, centerline extraction of segmented blood vessels using, e.g., MRI images, inspection of weld seam in various robotic manufacturing, etc.

In connection with the industrial image processing, a method is already known with which the length of the centerline of an object, the so-called arch length, is estimated mathematically ("Industrial Image Processing", Christian Demant, Bernd Streicher-Abel, Peter Waszkewitz, Berlin-Heidelberg; Springer, 1998). According to various methods of the prior art, the centerline of the object can be determined by a process generally referred to as skeletonizing or thinning of an object, according to which the object is progressively thinned by serially removing the outer pixels of the object until only the center pixels remain. The centerline is then represented by the collection of the remaining pixels ("Digital Image Processing", Bernd Jähne, $4^{th}$ edition, Berlin-Heidelberg, Springer, 1997). Although the characteristics of the various skeletonizing or thinning methods are very much different from each other, none of these methods provides an explicit and stable evaluation of the centerline of an object. The large variation in boundary conditions used for the skeletonizing of the object (breath and running path, continuous components, sensitivity to noise signals and convergence) cause substantial differences between the calculated one-pixel wide object and the actual centerline of the object to be evaluated.

According to other methods, the centerline of an object can be evaluated by scanning along its longitudinal direction. An example is illustrated in FIG. 1, wherein the broken arrow 105 depicts the scanning direction along object 100, having the scanning starting at the point marked "s" and ending at the point marked "e". The scanning direction is basically defined as the direction in which the examination of the object and the calculation of the centerline proceed. At each examination position along the scanning direction, a line laying in a transverse, i.e., orthogonal, direction to the scanning direction is referred to as the detection direction. At each point along the scanning direction, the detection direction is evaluated to determine the two points along the detection direction that are at the two opposite extreme ends of the object 100 (for the case of a two dimensional examination). In FIG. 1, points a and b illustrate two points on the detection direction, wherein each point delimits the opposite boundary of the object 100 at that particular location in the scanning direction. The line 110 connects the two points a and b and is orthogonal to the scanning direction at that particular point along the scanning direction. The mid-distance between these two points defines a point 115 on the line 110, which is set to be a point of the centerline of object 100 at this particular location along the scanning direction. The collection of all of the mid-distances along the scanning direction are set to represent the centerline of the object 100.

This method dependents on the local shape and location of the object to be examined and, therefore, this method is rather elaborate since the detection method has to be programmed separately for each shape and orientation of the object to be examined. That is, if one superimposes a Cartesian space as shown in FIG. 1, it is evident that for each object the scanning direction needs be accurately defined at each examination point, and at each examination point the detection direction needs to be defined. Consequently, the automatic determination of the centerline requires a lot of processing, and even slight variation in the image quality or in defining the scanning and detection directions at each examination point leads to different determination of the centerline.

Furthermore, a so-called "ad-hoc-method" is known in which the preliminary segmentation and path calculation steps across the whole object to be examined are replaced such that the center line is calculated at each segment for the actual centerline location. This method is used, for example, for the automatic local route planning as it is used for the virtual endoscopy and the virtual colonoscopy (U.S. Ser. No. 10/322,326). However, this method fails in case, for example, a steep bend is present in the object to be examined.

A step-by-step method (DE 11 2004 000 128 B4) assists in evaluating the respective centerline point at each position by means of a cluster of the cross section area. For carrying out this method, it is, however, necessary to previously know the coordinate data set as well as the very first starting position of the object to be examined. Furthermore, this method requires a very elaborate procedure, the simplification of which would be advantageous in many technical applications in which, for example, the centerline of an object to be examined is formed as a non-crossing or non-contacting line.

SUMMARY

The following summary is included in order to provide a basic understanding of some aspects and features of the disclosure. This summary is not an extensive overview of the invention and as such it is not intended to particularly identify key or critical elements of the invention or to delineate the scope of the invention. Its sole purpose is to present some concepts of the invention in a simplified form as a prelude to the more detailed description that is presented below.

Aspects of the invention provide a method which ensures rapid and precise evaluation of the centerline of different arbitrarily shaped objects. In various implementations, this method should prove as an automatic, universal and flexible method, which can be applied to different shapes without any changes in the source code. Applying the method to different shapes require merely a simple parameterization on the user interface.

According to aspects of the invention, a limited number of scanning directions and detection directions are defined beforehand. The scanning and detection can proceed only along these limited number of defined directions. Optionally, a limited number of smoothing functions are also defined. To analyze a new object, the image is divided into windows, wherein each window includes a section of the image that is either substantially straight or curved. In one embodiment the window selection is done by input from a user, but alternatively image processing techniques may be used. For each window, a scanning direction, a detection direction, and a smoothing function are assigned. The evaluation of the individual points of the centerline is then carried out for each window using the defined parameters. Thus, the rapid evaluation of the centerline of different arbitrarily shaped objects can be ensured by means of a simple parameterization without any changes to the computer programming source code. The appropriate detection direction and scanning direction is defined at each standardized definition of each test area.

According to one embodiment, the object is analyzed along its lengthwise run (scanning direction), step by step, in the detection direction, to determine the opposite side boundaries at each point along the run. The scanning direction is orthogonal or oblique, e.g., at 45 degrees, to the detection direction. On each line which connects the detected boundary points, a center point is determined and is defined as an individual point of the centerline at that location. This detection method is continued without interruption in the predefined scanning direction within the windowed test area. For defining the detection direction and the scanning direction, a direction coding is used which is common practice for coding the contour of an object in the image processing technology ("Industrial Image Processing", Christian Demant, Bernd Streicher-Abel, Peter Waszkewitz, Berlin-Heidelberg, Springer, 1998). The detection direction as well as the scanning direction may be defined, e.g., as one of a total of 8 directions (from 0 to 7). Thereby, an object can be examined independently from its shape and position. No new programming (source code change) for examining each new object is necessary.

In case the evaluation of the centerline of an object is to be carried out within a plurality of test areas (windows), a detection direction and a scanning direction is defined for each test area. According to an advantageous embodiment, the test areas are partially overlapping. The centerline is composed out of the portions which are formed in each test area using the centerline points evaluated for each area. The overlapping portions are taken into account of each two neighboring test areas and can be used for alignment. For this purpose, methods for image processing can be used which are known to a skilled person. Thereby, the centerline of all arbitrarily shaped objects can be evaluated which may even have a closed contour but may not comprise any branches.

According to disclosed embodiments, objects are inspected during manufacturing to find potential defects. Specifically, the method can proceed by calculating a difference between the length of the centerline and a reference length, and indicating an error when the difference surpasses a preset threshold. The inspection procedure can also include calculating average intensity of all pixels belonging to the centerline.

For example, the of quality of a weld of an object during manufacturing can be inspected by a computerized method, executing the steps: applying heating energy to the weld; obtaining a series of images of the weld, each image taken at a defined time interval; for each image, determining the pixels that belong to centerline of the weld; for each image calculating average intensity of the pixels that belong to the centerline of the weld; and, for each image storing the calculated average intensity. The method can also include the step of: for each image, using the pixels that belong to the centerline to calculate the length of the centerline and comparing the calculated length to a reference length.

Other aspects and features of the invention would be apparent from the detailed description, which is made with reference to the following drawings. It should be appreciated that the detailed description and the drawings provides various non-limiting examples of various embodiments of the invention, which is defined by the appended claims.

BRIEF DESCRIPTION OF THE DRAWINGS

The accompanying drawings, which are incorporated in and constitute a part of this specification, exemplify various embodiments and, together with the description, serve to explain and illustrate principles of the invention. The drawings are intended to illustrate major features of the exemplary embodiments in a diagrammatic manner. The drawings are not intended to depict every feature of actual embodiments nor relative dimensions of the depicted elements and are, therefore, not drawn to scale.

FIG. 1 illustrates an object to be examined according to the prior art, wherein the detection direction and the scanning direction of the object are calculated for each point along the object;

FIG. 2 is an illustration of a disclosed embodiment, wherein an object is examined by dividing it into a plurality of test areas, wherein individually assigned detection direction and the scanning direction are used for evaluating the centerline within each separate test area;

FIG. 3 illustrates assigned detection direction and the scanning direction according to one embodiment;

FIGS. 4A and 4B illustrate enlarged test area from FIG. 2, enclosing a straight section of the object;

FIGS. 5A and 5B illustrate enlarged test area from FIG. 2, enclosing a curved section of the object;

DETAILED DESCRIPTION

Figure 7:
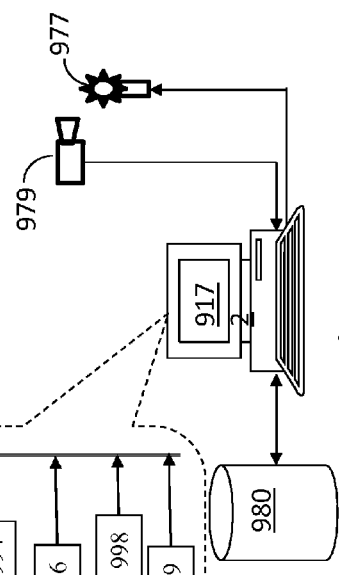
FIG. 7 illustrates a sectional view through a welding seam with defects of various types connecting two joint parts.

A description will now be provided of various embodiments which enable rapid evaluation of the centerline of an object. The method may be used for various applications, such as engineering, life sciences, mapping, etc. To provide a concrete example, some of the discussion that follows refers to the object as a weld seam, for example, weld seam used in fabricating metallic parts of a vehicle.

According to the following disclosed embodiments, an image of the object to be inspected is digitized. The digitized image is then divided into test areas, for example, using a user input on a screen, as shown in FIG. 2. The detection direction for each test area is set according to the shape and position of the portion of the object covered by this test area. In one example, the detection direction is set to one of four directions, so as to simplify the processing. Two basic directions and two angled directions are differentiated, as shown in FIG. 3. The horizontal direction from left to right, i.e., <x,0> in Cartesian space, is defined as the 0-direction, and the vertical direction from top to bottom, i.e., <0,−y> in Cartesian space, is defined as the 6-direction, both of which belong to the basic directions. The oblique directions, from the bottom left to top right, i.e., at 45° angle in the first quadrant, is defined as the 1-direction, and from top left to bottom right, i.e., −45° angle in the fourth quadrant, is defined as the 7-direction, both of which belong to the angled directions. Therefore, an object can be examined in all orientations.

According to the following embodiment, the scanning direction is defined for each test area, depending on the already defined detection direction as well as the position of its neighboring test areas. For simplifying the method, the scanning direction is defined as one of the following directions. In case the detection direction for the test area is defined as vertical from top to bottom (6-direction), the corresponding scanning direction is defined as horizontal from left to right (0-direction) or from right to left (4-direction), depending on the direction in which the total investigation is progressing. In case the detection direction is defined as horizontal or one of the two oblique side directions, the scanning direction is set as vertical in a direction depending on the direction of the total progress of the method, i.e., either from top to bottom (6-direction) or from bottom to top (2-direction). Note that in this embodiment the scanning direction is limited to horizontal or vertical directions only, and is either orthogonal or oblique to the detection direction, which may be horizontal, vertical or oblique at 45 degrees to the horizontal. It has to be assured that the detection of the center line continues from a previous to a following test area. Thereby, an object can be examined in its total orientation.

According to one embodiment, the scanning direction is evaluated for each test area depending on the detection direction which has previously been defined, as well as the position of its neighboring test areas automatically. Thereby, the corresponding parameterization of the method can be simplified. The resulting centerline is composed out of several detected portions, one portion for each test area. Because of the irregularities of the outer contour of the object to be examined, each segment of the centerline is a rather jagged curve. Accordingly, each portion of the centerline is individually smoothed according to a selected smoothing function. According to this embodiment, an appropriate smoothing method is individually selected for each detected portion, wherein the kind of smoothing function to be used is also used as a parameter of the method.

According to one example, a method calculating a straight line is used for smoothing a detected portion of the center line which originates from a straight portion of the object to be examined. As an example, the least squares method can be used ("Taschenbuch der Mathematik", I. N. Bronstein, K. A. Semendjajew, 25th edition, B. G. Teubner Verlagsgesellschaft, Stuttgart-Leipzig, and Edition Nauka, Moskau, 1991).

When using conventional filtering methods, in particular with an arbitrarily bent shape curve to be examined, the profile of the curves is rather distorted. The deficiencies of such filters can be avoided by using a morphological filtering which is provided for smoothing such a portion. Morphological filtering utilizes a non-linear methodology that delivers superior smoothing results for curves. See, e.g., Morphological Filtering for Image Enhancement and Feature Detection, in The Image and Video Processing Handbook, 2nd edition, Edited by A. C. Bovic, Elsevier Academic Press, 2005, pp. 135-156.

The example of FIG. 2 may be, for example, an image of a weld seam which has been derived with the aid of heat flow thermography and which is evaluated by means of image processing methods. The weld seam is shown as a dark object 200 on a light background of FIG. 2. Depending on the shape of the object, it is divided into test areas, shown in FIG. 2 as test areas 220a-220g. Each of the tests areas encompasses either a generally straight or a generally curved section of the object 200. For example, test area 220a encompasses a straight section of the object 200, while test area 220b encompasses a curved section of the object 200. This can be done, for example, by displaying the image on a monitor and having a user define the test section using an input device, such as a mouse.

The detection and scanning directions as well as the kind of smoothing functions are defined as parameters for each test area 220a-220g. The detection and scanning directions are selected from the predefined directions, for example using the directions definitions shown in FIG. 3. Therefore, using this definition method the source code remains unchanged for each teat area and/or object, such that the method for evaluating the centerline is implemented according to a modular design principle requiring only definitions of the parameters for each test area.

In this example, the detection and scanning directions are defined using the direction coding of eight directions shown in FIG. 3. The detection direction 210 from left to right (0-direction) is best used for a vertical object or for a correspondingly defined partial area of the object. This example is shown in FIG. 4A, wherein window 220a of FIG. 2 is replicated. The scanning direction 205 is selected from bottom to top, i.e., 2-direction. This scanning direction is chosen since the object section encompassed by test area 220a is generally straight elongated in the vertical direction. Thus both the 2-direction and the 6-direction can be used. However, this object section connects to the next section encompassed by test area 220b at the top, so for continuity of calculation it is better to select the 2-direction. The detection direction is selected as the 0-direction.

The coordinates of the points which form the centerline of the object portion of each test area are detected with the aid of the selected parameters as follows. The object 200 is examined step by step in the scanning direction along its lengthwise run in the corresponding detection direction, which in this example is set to be the orthogonal to the scanning direction. The line along which the detection is carried out extends without gaps in the scanning direction. At each position along the scanning direction, the coordinates of two closest opposite points of the outer contour of the object 200 are determined, as shown by points a and b in FIGS. 4A, 5A and 5B. The center point 225 of each line between such points represents a local point of the centerline of the object, and the collection of the midpoints 225 represents the centerline, as illustrated in FIG. 4B. In this way, each portion of the centerline is evaluated in each test area, and the coordinates of the pixels belonging to the centerline can be stored in computer memory.

To provide further example, the selection of parameters for analyzing test area 220*b* is now considered. Since the section of the object encompassed by test area 220*b* is curved and starts at the bottom of the test area 220*b*, but ends at the right side of test area 220*b*, it is best to define the detection direction as the oblique 7-direction. If the convention that the scanning direction is orthogonal to the detection direction is maintained, then the scanning direction is selected as the 1-direction, as shown in FIG. 5A. However, according to one embodiment the scanning direction can be defined only as horizontal or vertical. Accordingly, and for ease of calculation, it may be simpler to select the scanning direction as the 2-direction, as shown in FIG. 5B, in which case the scanning direction is oblique to the detection direction. Again, at each point along the scanning direction 205, the coordinates of the two points a and b at the edge of the object are found. The midpoint between these points is defined as the point of the centerline at that location.

It should be appreciated that in both cases, i.e., test areas 220*a* and 220*b*, the scanning direction does not necessarily follow the center or shape of the object. This is a rather significant departure from prior art methods and may result in a somewhat crude initial estimation of the centerline. Accordingly, for each segment a selected smoothing function is applied—depending on the shape of the object segment within the test area. For example, for test area 220*a* a least square function can be use, while for test area 220*b* a morphological filtering function can be applied. The selection of each function is done by selecting the smoothing parameter for each test area. That is, if the shape of the segment of the object within the test area is substantially straight, then a straight line function, such as least square function can be used. On the other hand, if the segment is substantially curved, a morphological filtering function can be used.

The collection of the smoothed curves are then connected to define the total centerline, and the length of the centerline can then be determined. The length of the centerline is evaluated pixel by pixel along the length of the centerline by adding the distances between all the pixels. The distance of the center of one pixel to the center of the adjacent pixel depends on whether the two pixels are adjacent to each other along a horizontal or vertical direction, in which case the distance is "1 unit", or along a diagonal direction, in which case the distance is "$\sqrt{2}$ unit". In order to get from the distances between the pixels in units to a length of the object in inches, centimeters, etc., the units of the pixel distances are summed up and multiplied by a conversion factor converting the units into measurement unit. The conversion factor for a particular arrangement between the actual object to be examined and the camera or other imaging device are known factors.

According to one embodiment, the absolute length of the centerline is of not much importance. Rather, the deviation of the length from expected, e.g., a reference length is considered. Thus, for example, if the difference between the reference length and the calculated length is within a set threshold, then the calculated length is defined as proper. For example, in the case of a weld seam, the proper length of the seam as designed can be input as a reference length. Then, for each actual weld, the length of the centerline is calculated as is compared to the reference length. If the difference is within a preset threshold, the weld is said to pass inspection. On the other hand, if the difference is larger than the reference length, the weld is said to fail inspection and may require further investigation.

As also shown in FIG. 2, according to one embodiment the test areas 220*a*-220*g* partially overlap each other at their meeting boundaries. The total center line of the object 200 is composed out of all evaluated portions, wherein the overlapping are taken into account. For this purpose, standardized method for the image processing can be used. For example, any program that performs image stitching utilizes an overlapping matching and elimination process. The stitching process also helps, since the first step in image stitching is image registration, which would align the segments of the centerline of each test area to generate a continuous centerline.

As can be understood from the above description, for each new object shape, test areas need to be defined, and the parameters for each test area need to be determined. Once this is done, images of objects of the same shape can be investigated using the entered parameters. For example, if a certain car door has five different-shaped welds, images of proper "reference" welds can be obtained. Then each image is divided into the proper number of test areas, and for each test area the parameters of scanning and detection direction and smoothing function need to be selected and assigned. The program can then be run to calculate the centerline length for each of the five welds to provide the reference lengths. Thereafter, as the manufacturing system produces more doors, the system can automatically take images of the welds and automatically, using the predefined test areas and parameters, calculate the centerline for each weld and compare to the reference length.

Figure 6:
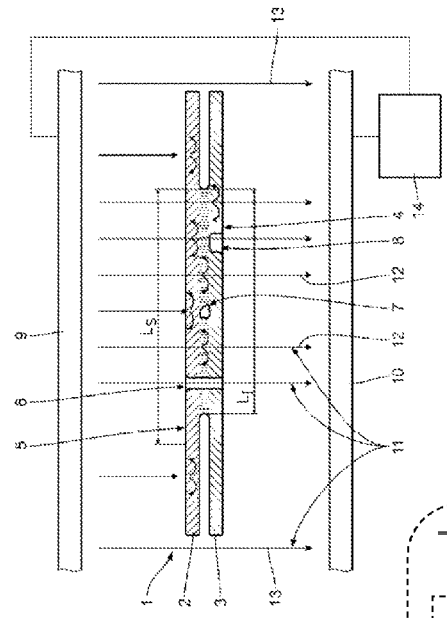
FIG. 6 illustrates an example of parameters table according to one embodiment.

The parameterization can be stored in the form of a table. An example is provided in FIG. 6, showing a table of parameters for the object 200 of FIG. 2. In the first column all of the test areas are listed. For each test area, the scanning direction and the detection direction are listed in the second and third columns, respectively. In the fourth column, the smoothing method to be used for each test area is indicated, wherein LSF stands for least mean square function and MF stands for morphological filtering.

As can be appreciated from the above description, the various embodiments calculate the length of the centerline and, in addition, can provide a list of coordinates of each pixel within the centerline of the object. The list of pixels can be used to provide valuable information about the object. The following example of making use of the pixel coordinate will be described with reference to inspection of weld seam. Similar use can be made for other applications.

As noted in the Background section, other methods are available in the prior art for measuring the length of the centerline; however, the methods disclosed herein have the advantage that one not only can determine the length of the centerline, but one can also get the coordinates of the specific pixels of the centerline. This information can be used for further analysis of the object, in addition to the length of the centerline. For example, the pixel information can be used for a weld seam analysis, such as that disclosed by the subject inventor in U.S. Patent Publication 2010/0163732, the disclosure of which is incorporated herein by reference in its entirety. For completeness and easier understanding, part of the disclosure is repeated herein as background information.

FIG. 7 illustrates a sectional view through a welding seam with defects of various types connecting two joint parts. The object 1 to be checked has a first joint part 2 and a second joint part 3, which are connected to one another by a welding connection in the form of a welding seam 4. The joint parts 2 and 3 are configured as metal sheets. The welding seam 4 was produced, for example, by means of an electron beam, laser beam or laser hybrid welding method. The material of the joint parts 2 and 3 is fused together in the region of the welding seam because of the welding process. The object 1 with the welding seam 4 will also be designated the welded material below.

The welding seam 4 has a plurality of defects of various types. As an example of a first defect type, the welding seam 4 has a geometric defect 5. The geometric defect 5 is a deviation of a desired length $L_S$ from an actual length $L_I$. Furthermore, the welding seam 4 has a continuous defect 6 in the form of a hole through the welding seam 4, which is a defect of a second defect type. As a defect of a third type, the welding seam 4 has an inner defect 7, which is defined as a pore, and is located in the interior of the welding seam 4. As a defect of a fourth defect type, the welding seam 4 has a surface defect 8, which is defined as a cut on the surface of the welding seam 4.

To inspect the weld for defects, an excitation source 9 and an infrared sensor 10 are arranged to illuminate and image the object 1, respectively. In one example, the infrared sensor 10 is arranged on the side of the object 1 from which the welding of the two joint parts 2 and 3 took place. Thus, for example, the laser beam can illuminate the object from the same side as the image acquisition. The object 1 and the welding seam 4 to be inspected are excited by means of the excitation source 9. Heat flow 11 is produced from the excitation, which is detected by the infrared sensor 10 in a series of thermal images recorded one after the other as the object cools. The detected heat flow 11 is composed of a heat flow 12 through the object 1 and a heat flow 13 directly from the excitation source 9.

To evaluate the detected series of thermal images, an arithmetic unit 14 is provided, which is connected to the excitation source 9 and the infrared sensor 10. The arithmetic unit 14 may execute a method for the automatic inspection of the welding seam 4 using heat flow thermography, as described below. The object 1 with the welding seam 4 is excited by means of the excitation source 9, which, for example, produces a flash. The heat flow 11 produced by the excitation is recorded by means of the infrared sensor 10, passed on to the arithmetic unit 14 and examined there.

Figure 8:
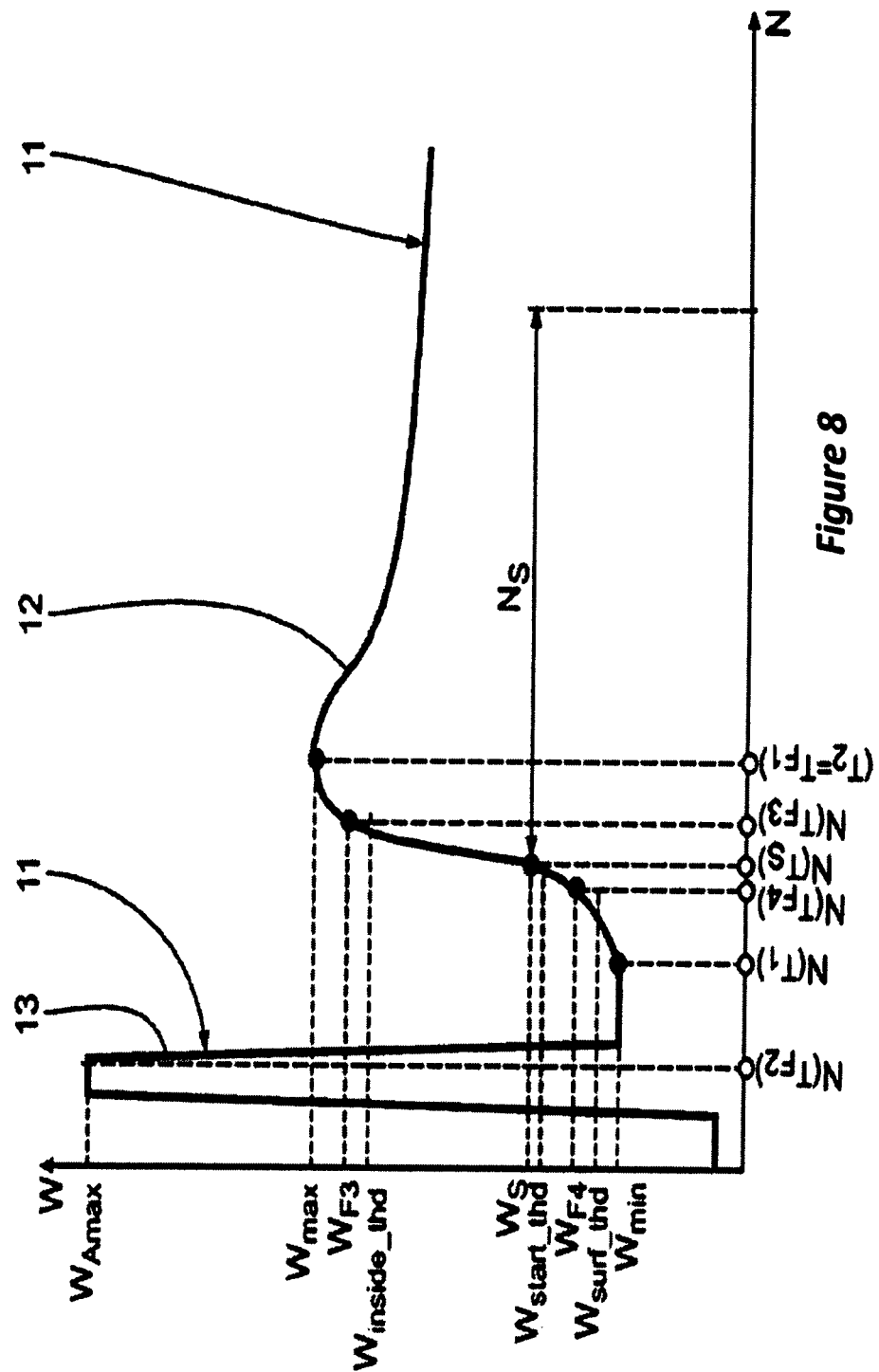
FIG. 8 illustrates a schematic view of a feature vector, which shows a time course of a recorded heat flow.

A feature vector W(N) is produced in the arithmetic unit 14 which corresponds to a time progression of the detected heat flow 11. An image number N is associated with each thermal image from the recorded series. A heat flow value W is calculated for each thermal image. The heat flow value W is produced, for example, as a mean value of the image values, which have the pixels of the infrared sensor 10 in a test region. The feature vector W(N) is produced by plotting the calculated heat flow values W over the image number N of the corresponding thermal image. An example of a feature vector W(N) is shown in FIG. 8.

The feature vector W(N) is a time course of the recorded heat flow 11. Accordingly, the heat flow 12 through the object 1 and the heat flow 13 directly from the excitation source 9 is shown in the feature vector W(N). Depending on the recording time, in other words the image number N, the time course of the heat flow in the feature vector W(N) has minima and maxima. The welding seam to be examined and the defects 5, 6, 7, 8 which have occurred can be recognised, depending on the defect type, at different recording times, in other words on different thermal images of the series. In order to ensure the best possible detection and evaluation of the welding seam 4, a suitable thermal image $T_{F1}$ to $T_{F4}$ is determined in each case for the defects 5, 6, 7, 8 for each defect type. For this purpose, a first characteristic thermal image $T_1$ and a second characteristic thermal image $T_2$ are firstly determined. The first characteristic thermal image $T_1$ is determined in such a way that a minimum is determined in the feature vector W(N), from which the heat flow 12 through the welded material starts to develop and the disturbing heat flow 13 from the excitation source 9 has already dissipated. The minimum corresponds to a minimum heat flow $W_{min}$ through the object 1, to which the first characteristic thermal image $T_1$ corresponds. The first characteristic thermal image $T_1$ is produced with the aid of the feature vector W(N) from the image number $N(T_1)$ associated with the minimum heat flow $W_{min}$.

Thereafter, the absolute maximum in the feature vector W(N) is detected in relation to thermal images of the series recorded later with respect to the characteristic thermal image $T_1$. From this maximum, the heat flow 12 through the welded material begins to drop. The maximum heat flow W through the object 1 is thus determined, to which the second characteristic thermal image $T_2$ corresponds. The second characteristic thermal image $T_2$ is produced with the aid of the material vector W(N) from the image number $N(T_2)$ associated with the maximum heat flow $W_{max}$.

The welding seam 4 can best be detected and evaluated on the second characteristic thermal image $T_2$, as the heat flow 12 through the welded material has an absolute maximum thereon, the heat flow 13 from the excitation source 9 having already dissipated. The geometric defect 5, which is a defect of a first type can best be detected and evaluated on the second characteristic thermal image $T_2$. The second characteristic thermal image $T_2$ is thus the suitable thermal image $T_{F1}$ for defects of the first defect type.

The continuous defect 6, which is a defect of a second defect type can, on the other hand, best be detected and evaluated on the last thermal image, which was recorded before the first characteristic thermal image $T_1$ and corresponds to a maximum heat flow W Amax directly from the excitation source 9. This thermal image is the suitable thermal image $T_{F2}$, which is best suited to the detection and evaluation of defects of the second defect type. The thermal image $T_{F2}$ is produced from the image number $N(T_{F2})$ associated with the maximum heat flow W Amax of the excitation source 9. As illustrated in FIG. 8, other images in the sequence can be used to detect the other defects. The particulars of the analysis of the images and defects types is further explained in more details in U.S. Patent Publication 2010/0163732.

According to one embodiment, the pixels belonging to the centerline are used as the basis required deriving the intensity feature vector of the heat flow and the information which is the basis required to select the appropriate characteristic images from which the various possible defects in the weld seam can be determined. Since the coordinates of the individual pixels of the center line are not being retrieved in the state of the art, these particular tasks for which the coordinates of the pixels of the center line are required, cannot be fulfilled by the state of the art. However, the method disclosed herein provides a rapid determination of the coordinates of the pixels that belong to the centerline, thus enabling this evaluation.

That is, according to one embodiment, the points of the centerline of the object can be used for the further examination of the object. For example, a weld seam can be examined based on an analysis of the heat flow through the object in order to identify defects. For detection of defects according to this embodiment, only the points (pixels) along the centerline in the interior of the weld seam are to be used. The heat flow is to be evaluated by using a plurality of interior points of the weld seam so that the individual points which may originate from a defect, do not play a substantial roll in the evaluation. For this purpose, the points of the centerline of the weld seam are most suitable. The heat flow through the weld seam is captured in an image sequence consisting out of several thermal images, as explained above. Therein, the change of the heat flow in time is captured, and the pixels of the centerline are used to calculate an intensity feature vector or curve, as shown in FIG. 8. Depending on the elapsed time from the excitation event, the captured intensity feature vector comprises minima and maxima and the so-called characteristic thermal images are determined using these minima and maxima. The characteristics of this intensity feature vector are used for selecting the thermal images on which the weld seam to be examined and the defects can be best seen, and the characteristic thermal images are at different points in time depending on the type of defect.

The thermal image which is adapted to evaluate a particular defect is to be evaluated and provided dynamically for each type of defect to be discovered. For this purpose, the intensity feature vector is used which represents a change in time of the captured heat flow through the weld seam to be examined. For each examination, one thermal image each is used on which the respective object (the weld seam itself and one of the searched defects) is to be best seen. The appropriate thermal images are evaluated dynamically by means of the intensity feature vector which represents the change in time of the captured heat flow through the examined weld seam. For this purpose, however, only the points in the area of the weld seam can be used. Otherwise, the captured information on the heat flow through the weld seam is wrong. For this purpose, the points on the centerline of the weld seam are most appropriate. Therefore, according to one embodiment, the heat flow is to be taken as an averaged value from all points on the centerline of the weld seam so that the individual pixels which can originate from a defect do not play any role in the evaluation. Since the method disclosed herein provides the coordinates of the pixels of the centerline, the average value of the intensity along the centerline can be calculated by averaging the intensity values of the pixels of the centerline.

According to one embodiment, the heat flow through a weld seam is captured in an image sequence of a plurality of images. Thereafter, for each thermal image in the sequence, the intensity values of all pixels of the centerline are summed up and divided by the number of pixels for each of the plurality of images (i.e., the intensity of the pixels of the centerline are averaged). Thereby, an average value for each captured thermal image is generated. All the calculated averaged centerline values are included and form the intensity feature vector so as to generate the curve of FIG. 8, which represents the change in time of the captured heat flow through the examined weld seam.

Depending on the point of time after the excitation, the captured heat flow comprises minima and maxima in the intensity feature vector, which minima and maxima determine the characteristic thermal images which are, thereafter, used for evaluation because the examined weld seam and the detected defects are best seen on the characteristic thermal images taken at different points of time. Different types of defects are best seen on the characteristic thermal images taken at different points in time.

Interior defect as well as surface defects can be detected on different thermal images which are located in between the minimum and the maximum of the intensity feature vector, where the point of time to be chosen (or the image to be chosen) depends on the type of defect.

Figure 9:
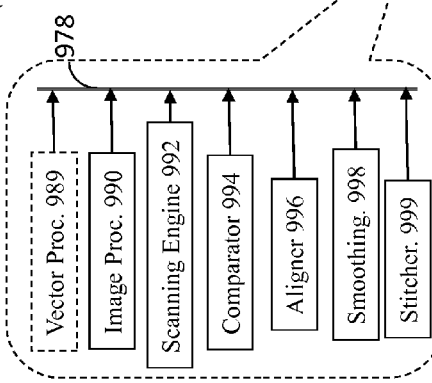
FIG. 9 schematically illustrates a system according to one embodiment.

An example of a system according to one embodiment is illustrated in FIG. 9. A general or specific purpose computer 917 controls illumination source 977, e.g., a laser source, and receives images from camera 979, e.g., an IR camera. The images may be optical, thermographical, x-ray, etc. The computer 917 includes one or more processors and various other hardware elements that are coupled via communication bus 978. The processor and various hardware and software elements operate together to form functional units which include, for example, image processor 990, a scanning engine 992, comparator 994, aligner 996, smoothing 998, and stitcher 999. The image processor may utilize various imaging processes to provide a better signal to noise ratio, smooth the image, remove extraneous or image artifacts, etc., so as to enable more accurate analysis. The scanning engine performs the scanning and detection method as described above, so as to obtain the centerline. The comparator can be used to compare the calculated length to the reference length. The aligner can be used to align the centerlines calculated for adjacent test areas. The smoothing engine performs the various smoothing operations according to the smoothing function defined for the test areas. The stitcher stitches the test areas so as to obtain the final centerline. The images, parameter data, and analysis results, including the coordinates of the pixels of the centerline, can be stored in database 980. If the system is used to inspect a weld seam, the system may optionally include a vector processor to perform the calculations explained above with respect to FIGS. 7 and 8.

To summarize, according to disclosed embodiment, a computerized method is executed on a computer for automatically determining a centerline of an object in an image. The method comprises: obtaining an image of the object; dividing the image to a plurality of test areas; defining a limited number of scanning directions; defining a limited number of detection directions; for each of the plurality of test areas assigning one of the scanning directions and one of the detection directions; examining each test area by scanning the image within the test area in the assigned scanning direction and at each scanning step performing a detection operation in the assigned detection direction to thereby designate one pixel within the detection direction as the localized centerline pixel, and thereby obtain a collection of localized centerline pixels corresponding to the centerline within the test area; storing the coordinates of the localized centerline pixels in the storage facility; and, summing up all the localized centerline pixels of all the test areas to thereby calculate the length of the centerline. Since the centerline obtained using the method may be rather jagged, the following steps may also be included, namely, defining a plurality of smoothing functions; for each of the plurality of test areas assigning one of the smoothing functions; and, for each of the plurality of test areas, applying the assigned smoothing function to the collection of localized centerline pixels of that test area. In order to determine the pixel belonging to the centerline, at each examination position the localized centreline pixel is calculated as the midpoint of a line connecting two boundary points of the object on the detection direction. To improve alignment and continuity, the test areas may partially overlap at their neighbouring boundaries. Also, the detection direction can be limited to consist essentially of the Cartesian directions: horizontal in positive x-direction, vertical in negative y-direction, 45 degrees in the first quadrant, and 45 degrees in the fourth quadrant. Additionally, the scanning direction can be set to be orthogonal or oblique to the detection direction.

According to one embodiment, when the detection direction assigned to a test area is limited to either the horizontal or the vertical direction, the smoothing function assigned to the test area is a root mean square function, and when the detection direction assigned to a test area is an oblique direction the smoothing function assigned to the test area is a morphological filtering function.

The disclosed method can be used to inspect objects during manufacturing. Specifically, the method can proceed by calculating a difference between the length of the centerline and a reference length, and indicating an error when the difference surpasses a preset threshold. The inspection procedure can also include calculating average intensity of all pixels belonging to the centerline.

Inspection of quality of a weld of an object during manufacturing can also be performed by a computerized method, which is executed on a computer having a storage facility, comprising the steps: applying heating energy to the weld; obtaining a series of images of the weld, each image taken at a defined time interval; for each image, determining the pixels that belong to centerline of the weld; for each image calculating average intensity of the pixels that belong to the centerline of the weld; and, for each image storing the calculated average intensity. The method can also include the step of: for each image, using the pixels that belong to the centerline to calculate the length of the centerline and comparing the calculated length to a reference length.

The process of determining the pixels that belong to centerline may comprises the steps: dividing the image to a plurality of test areas; defining a limited number of scanning directions to, for example, four directions including two horizontal and two vertical directions; defining a limited number of detection directions, for example, four directions including one horizontal, one vertical and two oblique directions; for each of the plurality of test areas assigning one of the scanning directions and one of the detection directions; examining each test area by scanning the image within the test area in the assigned scanning direction and at each scanning step performing a detection operation in the assigned detection direction to thereby designate one pixel within the detection direction as the localized centerline pixel, and thereby obtain a collection of localized centerline pixels corresponding to the centerline within the test area; and, applying a smoothing function to the collection of localized centerline pixels to thereby determine the pixels that belong to centerline. The step of applying a smoothing function may comprise defining a straight-line smoothing function and a curved-line smoothing function and applying the straight-line smoothing function when the detection direction is horizontal or vertical, and applying the curved-line smoothing function when the detection direction is oblique to the horizontal.

While the invention has been described with reference to particular embodiments thereof, it is not limited to those embodiments. Specifically, various variations and modifications may be implemented by those of ordinary skill in the art without departing from the invention's spirit and scope, as defined by the appended claims.

The invention claimed is:

1. A computerized method, executed on a computer having a storage facility, for automatically determining a centerline of an object in an image, comprising:
   obtaining an image of the object;
   dividing the image to a plurality of test areas;
   defining a limited number of scanning directions;
   defining a limited number of detection directions;
   for each of the plurality of test areas assigning one of the scanning directions and one of the detection directions;
   examining each test area by scanning the image within the test area in the assigned scanning direction and at each scanning step performing a detection operation in the assigned detection direction to thereby designate one pixel within the detection direction as the localized centerline pixel, and thereby obtain a collection of localized centerline pixels corresponding to the centerline within the test area;
   storing the coordinates of the localized centerline pixels in the storage facility; and,
   summing up all the localized centerline pixels of all the test areas to thereby calculate the length of the centerline.

2. The method of claim 1, further comprising:
   defining a plurality of smoothing functions;
   for each of the plurality of test areas assigning one of the smoothing functions; and,
   for each of the plurality of test areas, applying the assigned smoothing function to the collection of localized centerline pixels of that test area.

3. The method of claim 2, wherein at each examination position the localized centreline pixel is calculated as the mid-point of a line connecting two boundary points of the object on the detection direction.

4. The method of claim 2, wherein the test areas are partially overlapping.

5. The method of claim 2, wherein the detection direction consist essentially of the Cartesian directions: horizontal in positive x-direction, vertical in negative y-direction, 45 degrees in the first quadrant, and 45 degrees in the fourth quadrant.

6. The method of claim 5, wherein the scanning direction is one of orthogonal or oblique to the detection direction.

7. The method of claim 2, wherein:
   the detection direction consist essentially of a horizontal direction, a vertical direction, and at least one oblique direction at 45 degrees to the horizontal direction; and,
   wherein when the detection direction assigned to a test area is either the horizontal or vertical direction, the smoothing function assigned to the test area is a root mean square function and when the detection direction assigned to a test area is an oblique direction the smoothing function assigned to the test area is a morphological filtering function.

8. The method of claim 2, further comprising calculating a difference between the length of the centerline and a reference length and indicating an error when the difference surpasses a preset threshold.

9. The method of claim 2, further comprising calculating average intensity of all pixels belonging to the centerline.

10. A computerized method, executed on a computer having a storage facility, for inspecting quality of a weld, comprising:
    applying heating energy to the weld;
    obtaining a series of images of the weld, each image taken at a defined time interval;
    for each image, determining a pixels that belong to centerline of the weld;
    for each image calculating average intensity of the pixels that belong to the centerline of the weld; and,
    for each image storing the calculated average intensity;
    wherein determining the pixels that belong to centerline comprises the steps:
    dividing the image to a plurality of test areas;
    defining a limited number of scanning directions;
    defining a limited number of detection directions;
    for each of the plurality of test areas assigning one of the scanning directions and one of the detection directions;
    examining each test area by scanning the image within the test area in the assigned scanning direction and at each scanning step performing a detection operation in the assigned detection direction to thereby designate one pixel within the detection direction as the localized centerline pixel, and thereby obtain a collection of localized centerline pixels corresponding to the centerline within the test area; and, applying a smoothing function to the collection of localized centerline pixels to thereby determine the pixels that belong to centerline.

11. The method of claim 10, wherein the step of applying a smoothing function comprises defining a straight-line smoothing function and a curved-line smoothing function and applying the straight-line smoothing function when the detection direction is horizontal or vertical, and applying the curved-line smoothing function when the detection direction is oblique to the horizontal.

12. The method of claim 10, wherein the scanning direction is limited to a vertical or horizontal direction, and the detection direction is at 90 degrees or 45 degrees to the scanning direction.

* * * * *